(12) United States Patent
Watermann et al.

(10) Patent No.: US 10,544,550 B2
(45) Date of Patent: Jan. 28, 2020

(54) DEVICE AND METHOD FOR MONITORING PROCESS DATA IN ROAD FINISHING

(71) Applicant: MOBA Mobile Automation AG, Limburg (DE)

(72) Inventors: Marcus Watermann, Limburg (DE); Dominik Becher, Limburg (DE)

(73) Assignee: MOBA MOBILE AUTOMATION AG, Limburg (DE)

( * ) Notice: Subject to any disclaimer, the term of this patent is extended or adjusted under 35 U.S.C. 154(b) by 0 days.

(21) Appl. No.: 16/296,365

(22) Filed: Mar. 8, 2019

(65) Prior Publication Data
US 2019/0203429 A1 Jul. 4, 2019

Related U.S. Application Data

(63) Continuation of application No. 15/481,497, filed on Apr. 7, 2017.

(30) Foreign Application Priority Data

Apr. 8, 2016 (EP) .................................. 16164504

(51) Int. Cl.
| | | |
|---|---|---|
| G09B 1/08 | (2006.01) |
| E01C 23/07 | (2006.01) |
| G06Q 10/06 | (2012.01) |
| E01C 7/00 | (2006.01) |
| E01C 9/00 | (2006.01) |
| G08B 21/18 | (2006.01) |
| H04N 5/225 | (2006.01) |

(52) U.S. Cl.
CPC ............... *E01C 23/07* (2013.01); *E01C 7/00* (2013.01); *E01C 9/001* (2013.01); *G06Q 10/06* (2013.01); *G08B 21/182* (2013.01); *H04N 5/2257* (2013.01)

(58) Field of Classification Search
None
See application file for complete search history.

(56) References Cited

U.S. PATENT DOCUMENTS

| | | | |
|---|---|---|---|
| 7,034,677 B2 * | 4/2006 | Steinthal ................ B82Y 30/00 128/903 |
| 9,833,197 B1 * | 12/2017 | Elhawary ............... G16H 20/30 |
| 9,861,151 B2 * | 1/2018 | Ciaramelletti ........ A61B 5/1116 |
| 2012/0242501 A1 * | 9/2012 | Tran ..................... A61B 5/0024 340/870.02 |
| 2015/0149018 A1 * | 5/2015 | Attard .................. G05D 1/0061 701/23 |
| 2015/0161872 A1 * | 6/2015 | Beaulieu ................ B66C 13/40 340/686.6 |
| 2015/0364026 A1 * | 12/2015 | Rubin .............. G06Q 10/06311 340/539.11 |

(Continued)

OTHER PUBLICATIONS

Watermann et al., "Device and Method for Monitoring Process Data in Road Finishing", U.S. Appl. No. 15/481,487, filed Apr. 7, 2017.

*Primary Examiner* — Julie B Lieu
(74) *Attorney, Agent, or Firm* — Keating & Bennett, LLP (57) ABSTRACT

A wearable computer is used for monitoring process data in road finishing. The wearable computer receives process data of the road finishing process. In the event of process data lying outside a predetermined range, the wearable computer effects alerting of the wearer of the wearable computer.

13 Claims, 6 Drawing Sheets

(56) References Cited

U.S. PATENT DOCUMENTS

| | | | |
|---|---|---|---|
| 2016/0171864 A1* | 6/2016 | Ciaramelletti | A61B 5/1116 340/539.12 |
| 2016/0253895 A1* | 9/2016 | Prakah-Asante | G08B 21/0453 340/539.12 |
| 2016/0379473 A1* | 12/2016 | Bharti | G08B 25/016 340/539.11 |
| 2017/0023509 A1* | 1/2017 | Kim | G01N 27/126 |
| 2017/0061758 A1* | 3/2017 | Sudo | G08B 19/00 |
| 2017/0243034 A1* | 8/2017 | Ben-Bassat | G06Q 10/0875 |
| 2017/0309152 A1* | 10/2017 | Dinkins | G08B 21/0461 |
| 2017/0347965 A1* | 12/2017 | Elhawary | G06F 19/3481 |
| 2018/0053103 A1* | 2/2018 | Delgado | G06N 5/04 |

* cited by examiner

DEVICE AND METHOD FOR MONITORING PROCESS DATA IN ROAD FINISHING

CROSS-REFERENCE TO RELATED APPLICATIONS

This application claims priority from European Patent Application No. 16164504.9, filed Apr. 8, 2016, which is incorporated herein by reference in its entirety.

The present invention relates to the field of road finishing, in particular to monitoring of process data in road finishing as accumulates, e.g., in the preparation of the subsoil for finishing the new road, in the placing of the asphalt surfacing and in the finishing of the introduced asphalt surfacing. Such process data includes, e.g., the temperature of the asphalt material prior to introduction thereof as the road surface, during introduction and during finishing, the layer thickness of the material introduced or the layer thickness of subsoil removed, for example by means of milling or by other soil working machines. Further process data includes monitoring of the temperature during delivery of the asphalt material from the place of manufacture to the construction site and/or the time duration of the transport or the downtimes of construction vehicles transporting the asphalt material. In particular, the present invention relates to the field of construction machines and construction vehicles such as road finishing machines, road millers, road rollers and trucks and/or construction vehicles for transporting asphalt, for example.

BACKGROUND OF THE INVENTION

In the production of a road surface, a multitude of process data accumulates. From an asphalt mixing plant to transport and placing of the asphalt up to finishing of the road surface. The process data is, e.g., the temperature of the asphalt, the weight of the asphalt placed, the compaction values, the degree of segregation, the evenness or the layer thickness of the finished road. To ensure high quality and durability of the road, said process data should be permanently monitored. In addition, material consumption as well as the truck downtimes, e.g., the waiting times prior to reaching the finishing machine, for example, play an equally important part in the finishing process and influence the quality of the road surface to be produced since, for example, in the event of relatively long truck downtimes, the material will cool off to a higher degree or since due to excessive material consumption, increased cost of the road will result, which are typically to be borne by the executing company.

Thus, when building a road, there is a large amount of interest in an optimized placing process. In conventional technology, approaches have been known to monitoring the entire construction process with regard to the run times of the finishing machine and with regard to material supply, namely the delivery of the asphalt by the trucks as well as the above-mentioned truck downtimes, and to keeping them within an optimum range. In addition, approaches have been known wherein some of the above-mentioned process data, which is influenced and/or changed by various machines and vehicles on the way from the asphalt mixing plant to the construction site, are continuously monitored and documented, for example by the BPO system by Volz Consulting GmbH (see http://www.volzconsulting.de).

The disadvantage of the approaches known in conventional technology consists in that portable computer devices are used at the construction site, e.g., laptops, smartphones or tablet computers, which have corresponding software programs running thereon via which monitoring of the above-mentioned process data by a site manager is facilitated. However, the known approaches operate such that the entire building process and the relevant process data is provided, so that it involves a large amount of effort on the part of the site manager, or project manager, in situ to keep an eye on all of the process data, in particular with the aim of ensuring that specific data remain within certain limits. If a data value changes, so that same is outside the mentioned range, this will not be readily apparent for the site manager, even if the device generates a visual, acoustic or tactile alert (vibrating alert) since the device is not held or watched by the site manager at any time since said site manager will perform actions, within the framework of his/her job as the site manager, during which he/she does not have an eye on the process data provided, for example when giving instructions or during a discussion with other persons as the construction site. Thus, a situation may arise where a data value leaves an admissible range or desired range and where this fact is detected with a delay only, so that the appropriate countermeasures will be taken with a time delay.

SUMMARY

According to an embodiment, a device for monitoring process data in road finishing may have a wearable computer, the wearable computer being configured to receive process data of the road finishing process, and the wearable computer being configured to effect alerting of the wearer of the wearable computer in the event that process data lie outside a predetermined range.

According to another embodiment, a method of monitoring process data in road finishing may have the steps of: receiving process data of the road finishing process on a wearable computer, and alerting the wearer of the wearable computer by the wearable computer if the process data lies outside a predetermined range.

According to another embodiment, a non-transitory digital storage medium may have a computer program stored thereon to perform the inventive method, when said computer program is run by a computer.

In accordance with embodiments, provision may be made for the wearable computer to effect visual alerting, acoustic alerting, tactile alerting or a combination of these types of alerting; tactile alerting may include a vibrating alert. In accordance with further embodiments, the wearable computer is configured to present the process data to a wearer of the wearable computer. In accordance with yet further embodiments, the wearable computer is a data watch (e.g., a smartwatch) or data eyeglasses (e.g., smart eyeglasses) or an electronic contact lens or a head-up display or an augmented-reality display device and/or a similar adaptive device worn by the wearer, e.g., the site manager.

The inventive device is advantageous since it serves to enable a site manager, project manager or a similar person who is at the construction site to more quickly recognize critical data and/or critical ranges during a road finishing process, whereby he/she is enabled to take appropriate countermeasures more quickly. Utilization of a wearable computer, for example a data watch worn on the wrist, which is also referred to as a smartwatch, or a pair of data eyeglasses being worn, for example, is advantageous since this ensures that the wearer is in contact at any time with the wearable computer on which the data is displayed while still being able to mainly concentrate on his/her work since he/she need not steadily monitor a display or screen. In addition, process data lying outside a predetermined range enable an alert being output by the wearable computer device, which alert will be directly perceived by the wearer of said wearable computer, for example a vibrating alert, which is perceivable on the wearer's wrist and/or face and will direct the wearer's attention to the wearable computer and the process data displayed, so that the wearer will recognize readily and without any time loss when the process data leaves a desired range, and thus may take appropriate countermeasures. As a result, the above mentioned problems relating to a reduced quality of the placing and/or relating to possibly increased cost due to increased material expenses are avoided.

In accordance with embodiments of the present invention, provision is made for the wearable computer to be configured to receive the process data from a construction site where the road finishing is performed, from a place of manufacture where the material for the road finishing is produced, and/or from one or more positions between the place of manufacture and the construction site.

This approach is advantageous since in this manner, critical process data may be monitored during the entire finishing process, from the asphalt mixing plant to finishing of the road surface, so as to immediately inform the site manager on site about possible deviations. For example, the inventive approach enables recognizing any deviations of a temperature of the asphalt material from a target temperature that occur at the mixing plant already, so that the site manager may point this error out to the asphalt mixing plant by getting into contact with them before the asphalt material is transported away from the plant, so that the insufficiently warm or excessively hot asphalt material does not even reach the construction site. Likewise, other parameters of the asphalt material may also be detected at the site of the asphalt mixing plant and be monitored with regard to complying with specific parameter values such as monitoring the amount of the material by means of the weight output by the asphalt mixing plant. Moreover, the temperature may be monitored along the route from the asphalt mixing plant to the construction site via communication with the transport vehicle, or construction vehicle, so as to give the driver of the vehicle instructions, e.g., to drive quickly to the construction site so as to deliver the asphalt material at a sufficient temperature. The number of transport vehicles on their way to the construction site may also be monitored, so that, for example, in case a waiting time of the construction vehicles at the construction site prior to reaching the road finisher exceeds a limiting value, no further vehicles will be requested.

In accordance with further embodiments, the device includes a computer configured to receive process data for a plurality of parameters of the road finishing, the computer and the wearable computer each including a wireless communication module, and the computer being configured to enable the wearer of the wearable computer to select at least one parameter from the plurality of parameters of road finishing and to effect transmission of the process data of the selected parameter to the wearable computer.

This implementation is advantageous since it enables cooperation with wearable computers known in conventional technology, for example laptops, smartphones or tablet computers, on which process data concerning the construction site has already been collected, as was explained above in the introduction to the description. A user, for example the project manager, may select, by means of said devices, which process data is critical at the current point in time, and which ranges may be kept to, so that only the critical process data is transmitted to the wearable computer so as to effect the inventive alerting directly at the wearer of the wearable computer.

In accordance with embodiments of the invention, the computer includes a wearable computer arranged at the construction site or a control computer of construction machine, of a construction vehicle or of a sensor.

This implementation is advantageous since according to the invention, utilization of wearable computers as have already been in use in known approaches is enabled without involving any additional hardware. Also, utilization of the control computer of a construction machine, of a construction vehicle or of a sensor is advantageous since in this case, one may directly resort to existing hardware with which the wearable computer may enter into direct contact so as to provide the inventive functionality.

In accordance with a further embodiment, the device includes a central computer arranged at a distance from the construction site and the place of manufacture and including a mobile radio module so as to establish a terrestrial or satellite-based mobile radio link between one or more construction machines and/or one or more construction vehicles and/or one or more sensors and the central computer, the computer including a mobile radio module so as to effect a terrestrial or satellite-based mobile radio link with the central computer so as to obtain the process data via the central computer.

This implementation is advantageous since in this manner, central management of the process data from one or more construction sites is enabled, and starting from the central station, the relevant process data may be transmitted to the computer for forwarding to the wearable computer while using a mobile radio network.

In accordance with further embodiments, the device includes a pair of data eyeglasses including a camera, the pair of data eyeglasses being configured to send an image of a construction machine, of a construction vehicle or of a sensor from which the process data is to be received, to the computer via the wireless communication module, the computer being configured to identify the unit depicted in the received image, to request process data for at least one selected parameter from the identified unit, and to send the process data for the selected parameter to the data eyeglasses, via the wireless communication module, for presentation to the wearer of the data eyeglasses.

This implementation is advantageous since in this manner, a simple selection of the unit is enabled from which the site manager or, more generally speaking, the wearer of the data eyeglasses wants to obtain information, in particular process data to be monitored with regard to complying with limiting values. The selection is performed via the imaging method and involves no communication with the computer or the construction machine itself, so that a selection of the unit that is currently of interest and is to be monitored becomes possible in a simple manner.

In accordance with further embodiments, the wearable computer is configured to enable the wearer to perform an input, in response to the alert, so as to control the road finishing process such that the process data returns to the predetermined range.

This implementation is advantageous since in this manner, the site manager is given the possibility, for example, to immediately react to the alerting, i.e., to immediately react to the fact that a process parameter has left the permitted range. By means of a corresponding input via the wearable computer, a control signal is generated which is returned to the corresponding unit, for example to the construction machine, so as to modify, for example, the settings of the construction machine, so that the process data will once again lie within the desired range. Thus, in accordance with this embodiment, fast, or immediate, reaction to the alerting is enabled without involving any input at the computer connected therebetween or at the construction machine or at the unit to be controlled, as a result of which the reaction time is increased.

The present invention further provides a method of monitoring process data in road finishing, the method comprising:

receiving process data of the road finishing process on a wearable computer, and alerting the wearer of the wearable computer by the wearable computer if the process data lies outside a predetermined range.

In accordance with embodiments, the method further comprises presenting the received process data to a wearer of the wearable computer. In accordance with further embodiments, the method further includes, in response to the alerting, generating an input on the wearable computer, and in response to the input, controlling the road finishing process such that the process data returns to the predetermined range.

Thus, in accordance with embodiments the invention relates to continuous monitoring of the entire construction process of a road by means of data eyeglasses or a data watch whereon process data, in particular critical data, may be quickly indicated to a site manager, project manager or a similar person who is on the construction site. Critical data is process data, for example, which is outside an admissible range, for example a temperature of a building material/asphalt delivered in a truck being too low, the average temperature measured downstream from the road finisher being too low, and the like. If such process data is detected to lie outside an admissible range, countermeasures may be taken immediately so as to ensure the desired placing quality of the road.

BRIEF DESCRIPTION OF THE DRAWINGS

Embodiments of the present invention will be detailed subsequently referring to the appended drawings, in which.

DETAILED DESCRIPTION OF THE INVENTION

In the subsequent description of the advantageous embodiments of the present invention, elements which are identical or have identical actions will be provided with identical reference numerals.

Figure 1:
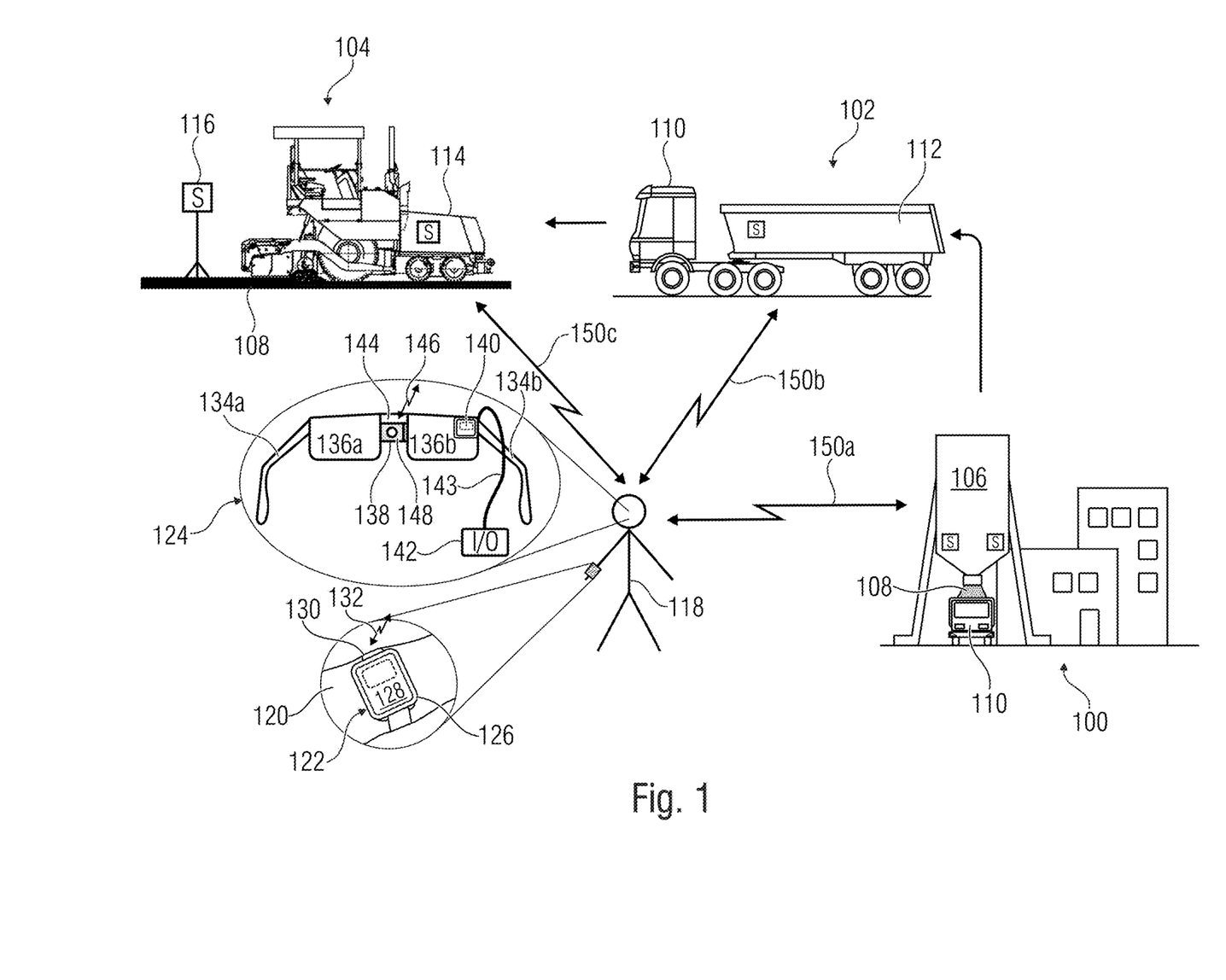
FIG. 1 is a schematic overview of a road finishing process wherein the inventive approach to monitoring process data is employed.

FIG. 1 shows a schematic overview of a road finishing process wherein the inventive approach to monitoring process data is employed. FIG. 1 shows the road finishing process starting with an asphalt mixing plant 100, via the transport of the asphalt material, which is schematically shown at 102, to the production of the road surface at the construction site schematically depicted by 104.

The asphalt mixing plant 100 includes a storage container 106 containing an asphalt material 108 which is to be used for building and which is filled into a truck 110, e.g., a dumper-type semitrailer truck, for being transported to the construction site 104. The composition and temperature of the asphalt material 108 are monitored within the asphalt mixing plant via corresponding sensors S schematically shown in FIG. 1 so as to ensure that the asphalt material 108 is output by the asphalt mixing plant 100 with a predefined quality.

During transport 102 by means of the truck 110, the temperature of the asphalt material located within a transport trough 112 is monitored, for example. Moreover, the journey time of the truck 110 from the asphalt mixing plant 100 to the construction site 104 may be monitored during transport 102, as may the number of trucks 110 used for the transport. Monitoring of the temperature is effected by means of a sensor S which is either arranged within the trough 112, as is shown in FIG. 1, or is part of the tractor of the truck 110.

At the construction site 104, the asphalt material 108 is placed by means of a road finishing machine 114, which obtains the asphalt material from one of the trucks 110 and builds it in in a manner known per se. The road finishing machine 114 may comprise corresponding sensors S so as monitor specific parameters of the material processed, for example the temperature of the asphalt material, the placement thickness and the like. Additionally or alternatively, these parameters may also be detected by external sensors 116 located at the construction site 104, for example by hand-wearable temperature sensors by means of which workers detect the temperature of the placed asphalt layer immediately downstream from the road finishing machine 114.

In addition, finishing of the asphalt surfacing introduced by the finisher 114 may be provided at the construction site 104, for example by means of road rollers. Specific parameters such as the compaction degree or the thickness of the finished layer, for example, may be monitored by corresponding sensors even during finishing by the road rollers. Moreover, provision may be made, in the context of building a road, for working on the subsoil prior to the actual placement of the asphalt surfacing, for example by means of a road miller which at least partly removes an old surface. Alternatively, it is also possible to remove the entire road surface and to newly process the subsoil, for example by means of corresponding construction machines such as excavators, bulldozers and the like. The same applies to a completely new reconstruction of a road, wherein placement of the asphalt layer is preceded by preparation of the subsoil accordingly by means of appropriate construction machines. Predetermined parameters may be monitored during said preparatory work as well, such as the amount of the old asphalt layer removed and/or the height of the ground worked on, e.g., in relation to a reference height. For this purpose, too, the corresponding construction machines comprise corresponding sensors.

The parameters monitored within the asphalt mixing plant 100, during transport 102 and at the construction site 104 by the above-mentioned sensors generate process data by means of which compliance with specific limiting values can be monitored. As was already mentioned above, approaches have been known wherein the process data is received and monitored, at the construction site 104, by the various sensors or at least some of the sensors so as to enable a site manager to control the construction process. In order to solve the problems arising in conventional technology with regard to process data which indicates deviations of the parameters outside specific ranges, an approach is proposed, according to the invention, wherein, e.g., the site manager 118 responsible for the construction site 104 wears a so-called wearable computer, i.e., a computer system arranged and/or fixed on the body of the site manager 118 during application. The wearable computer differs from utilization of other mobile computer systems, for example laptops, smartphones or tablet computers, in that the site manager's main activity is not utilization of the computer itself. Within the context of the present invention this means that the site manager 118 wears the wearable computer and obtains via said wearable computer predetermined process data from the various sensors regarding the desired parameters. In accordance with the embodiment shown in FIG. 1, the wearable computer is a data watch 122 (also referred to as a smartwatch below) worn on the arm 120 of the site manager 118 and/or a pair of data eyeglasses (smart eyeglasses) 124 worn by the site manager 118.

The smartwatch 122 may be an essentially commercial smartwatch that was programmed in accordance with the teachings of the present application and/or which has an application installed thereon, for example a program, e.g., an app, operating in accordance with the teachings of the present application. The smartwatch 122 contains a body 126 wherein the data processing elements not depicted in the figure are arranged so as to implement the inventive functionality. Moreover, the smartwatch 122 includes the display 128, for example in the form of a touch screen, via which process data is displayed, as will be explained in more detail below. By means of the touch screen one may further be enabled to perform an input into the smartwatch 122, which will then be transmitted to a remote location, for example, as will be explained in more detail below. The smartwatch 122 further includes the wireless communication module 130, schematically depicted in FIG. 1, for enabling wireless communication 132.

The data eyeglasses 124 may be essentially commercial data eyeglasses that were programmed in accordance with the teachings of the present application and/or which has an application installed thereon, for example a program, e.g., an app, operating in accordance with the teachings of the present application. The data eyeglasses 124 include two temples 134a, 134b, between which two lenses 136a, 136b are arranged which are connected to each other via a bridge 138. One or more of the lenses 136a, 136b include(s) a display portion 140 on which data to be presented to the wearer of the eyeglasses 124 can be displayed. In addition, the data eyeglasses 124 include an input/output unit (I/O unit), which may further comprise the data processing elements that may be used so as to be able to run a program operating in accordance with the teachings of the present application. The I/O unit 142 is connected to the display area 140 via a cable 143 so as to provide the display area 140 with the data that may be used for display. In addition, the I/O unit 142 enables data being input by the wearer of the glasses 124. In the example shown, the data eyeglasses 124 include, in the area of the bridge 138, a wireless communication module 144 for wireless communication 146, and a camera module 148.

In accordance with the embodiment, depicted in FIG. 1, of the present invention, the wearable computer 122, 124 worn by the site manager 118 is provided for receiving process data regarding the road finishing process, as is schematically depicted by arrows 150a to 150c. By means of the wireless communication module 130, 144, the wearable computer is able to receive process data regarding predetermined parameters from the asphalt mixing plant 100 during transport of the asphalt and/or from the construction site. Selected process data may be displayed on the display 128, 140 of the wearable computer 122, 124; a predetermined, or admissible, range within which the displayed process data is supposed to lie is predefined. If this range is left, the site manager 118 is alerted, for example in that a vibrating alert is triggered. Alternatively or additionally, a visual or acoustic alert may be triggered, so that the site manager 118 is immediately informed of any deviations as soon as they occur without constantly having to keep an eye on the process data. This enables the site manager to initiate appropriate countermeasures without delay, for example by taking measures at the asphalt mixing plant 100, during transport 102 and/or at the construction site 104. These measures may be initiated, for example, by an input being effected via the wearable computer 122, 124, which input will then be forwarded to the corresponding units via the wireless communication module 130, 144.

Figure 2:
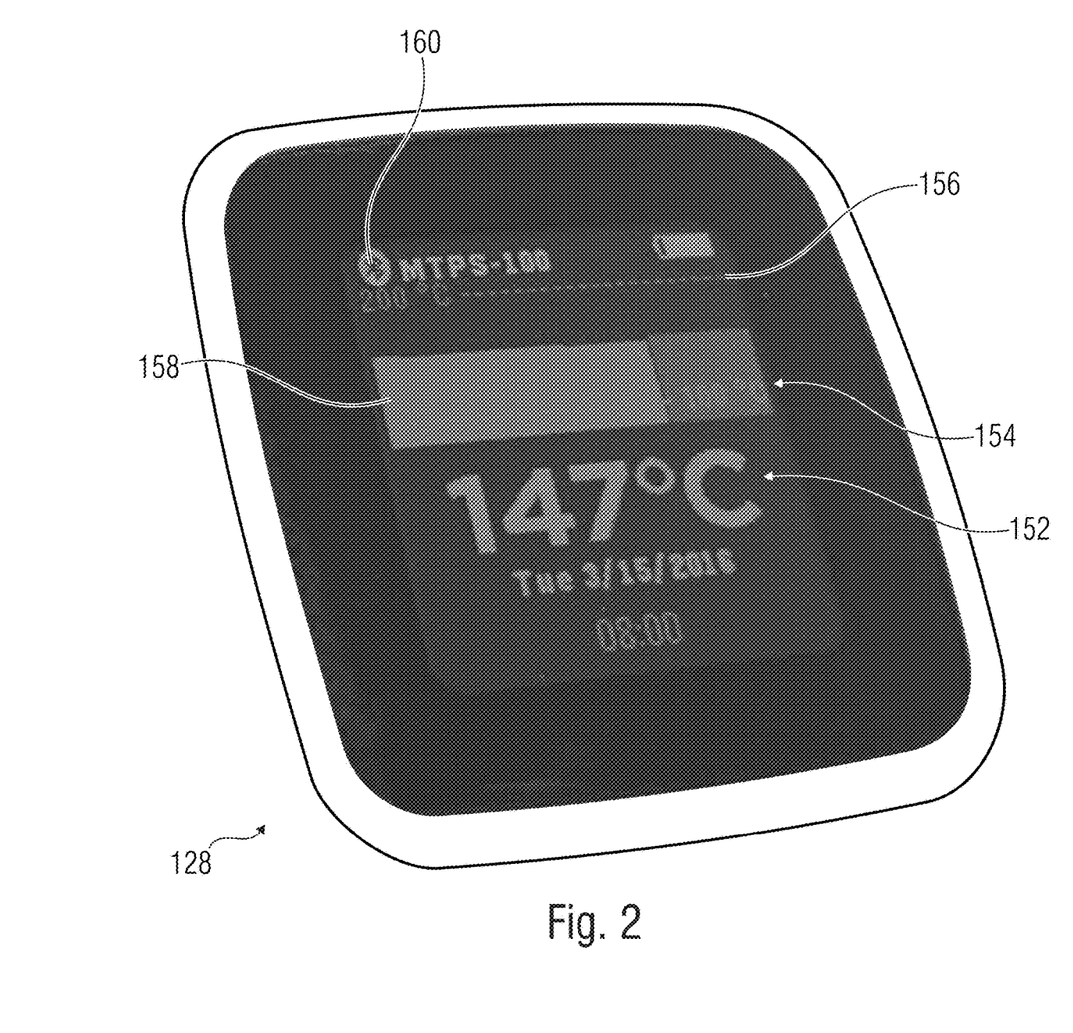
FIG. 2 shows an exemplary presentation of process parameters on a display of a wearable computer.

FIG. 2 shows an exemplary representation of process parameters on a display 128, 140 of a wearable computer 122, 124. Actually, FIG. 2 shows a representation of the display 128 of a smartwatch 122 which has been programmed in accordance with the teachings of the present application. In the embodiment shown in FIG. 2, the smartwatch 122 displays the temperature of the asphalt material on its display 128, for example the temperature of the asphalt material during its processing by the road finishing machine 114. The temperature of the asphalt material during its processing and/or placement on the part of the road finishing machine 114 is detected at the plank of the road finishing machine or by an external, e.g., hand-worn, sensor 116, as was discussed above. In the area 152, the display 128 includes a numerical indication of the temperature value. In the upper part of the display 128, the temperature is depicted graphically, the display 128 indicating a lower limit 154 and an upper limit 156 of the temperature, which in the embodiment shown are 100° C. and 200° C., respectively. The numerical indication 152 is further depicted graphically over a predetermined time duration, as is shown at 158. As can be seen, the upper limits for the temperature range approximately halfway between the lower limit 154 and the upper limit 156, i.e., within the admissible range. The area 160 of the display 128 indicates that there is a wireless communication, a Bluetooth communication in the embodiment depicted, with the device MTPS-100, which is also indicated, so that the display 128 indicates the temperature, on the one hand, and indicates where the temperature comes from, on the other hand, i.e., which unit it comes from, which in the embodiment shown is either the road finishing machine 114 or the sensor 116. In the area below the numerical temperature indication 152, the date and the current time of the day are indicated as well.

FIG. 2 is merely an exemplary representation, and in accordance with other embodiments, other process parameters or additional process parameters may also be displayed. Moreover, provision may be made for indicating a purely graphic representation of the process data or a purely numerical representation of the process data, an indication of the upper limit/lower limit being optional in accordance with embodiments. For utilization in accordance with the invention it is sufficient for the smartwatch to have knowledge of the limits (without the limits needing to be displayed), so that when said limits are exceeded/fallen below, corresponding alerting may be triggered and be displayed accordingly.

In accordance with the invention, therefore, process data is displayed on the smartwatch or on the data eyeglasses, and the smartwatch and/or the data eyeglasses is/are capable of showing a reaction in the event that process data lie outside an admissible range 154, 156, for example by alerting the wearer and/or site manager, either by means of an acoustic signal, a visual signal or by means of tactile alerting. In accordance with embodiments, the reaction shown by the wearable computer may include vibrating, blinking and/or outputting of a warning tone. The vibrating function is advantageous in the use at the construction site 104 since there is usually a large amount of noise in the surroundings of the construction site and since a warning tone might not be perceived by a person.

The site manager or project manager 118 present at the construction site may immediately take appropriate measures, in accordance with embodiments, in response to the alert, such as reduce or increase the speed of the road finishing machine 114, change machine parameters on the road finishing machine 114 or on the roller of a miller, change mixing temperatures at the asphalt mixing plant and the like so as to thereby ensure the desired placement quality of the road.

Further embodiments of the present invention will be explained in more detail below with reference to FIGS. 3 to 5, said embodiments being explained by means of the smartwatch 122 shown in FIG. 1, the explanations being equally applicable, however, when data eyeglasses 124 in accordance with FIG. 1 are used. In addition, the embodiments shown in FIGS. 3 to 5 will be explained by means of a data communication between the wearable computer and a road finishing machine 114 at the construction site 104; however, the embodiments and explanations which follow will equally apply to communication with other units which provide data at the construction site 104 and/or during transport 102 or at the asphalt mixing plant 100.

Figure 3:
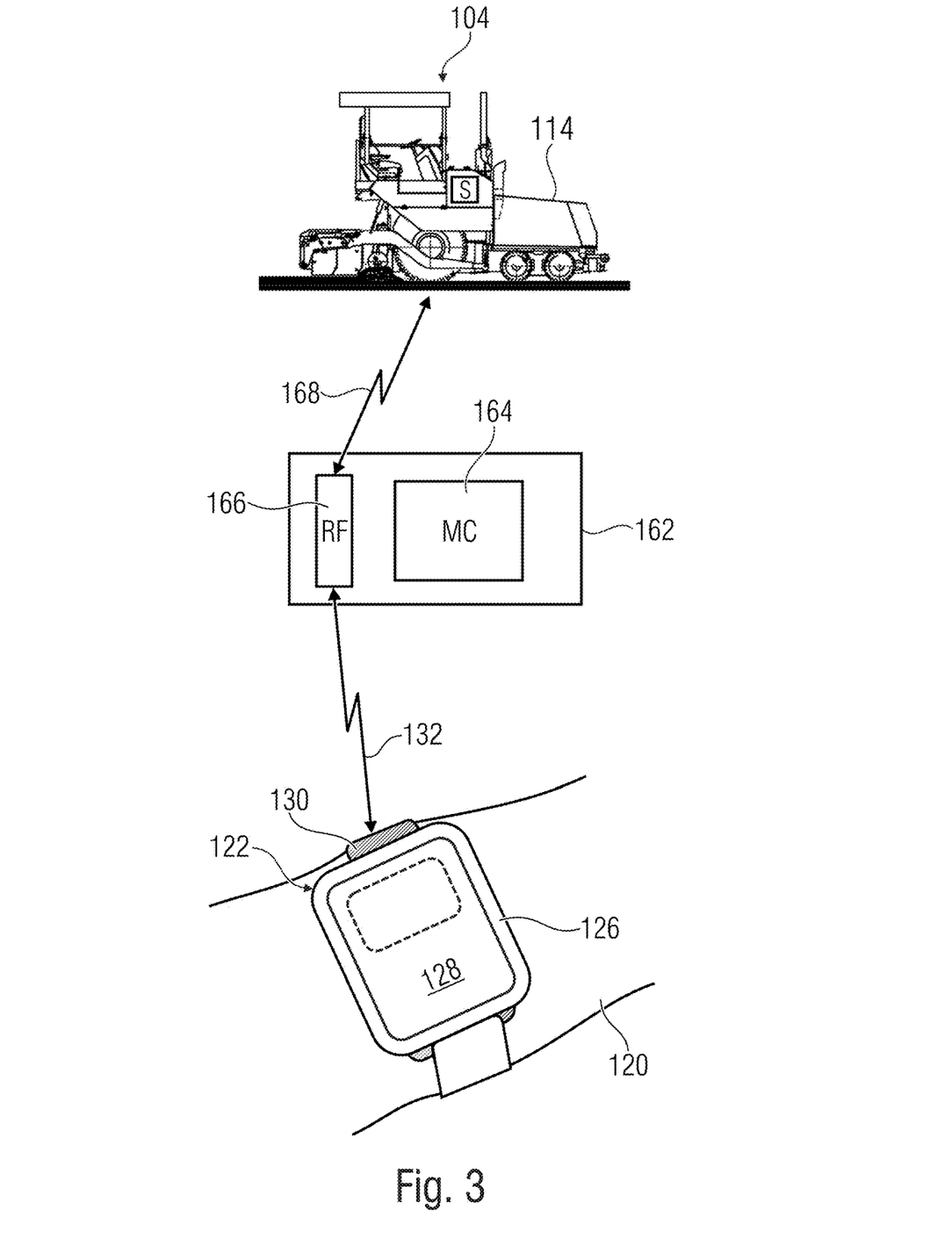
FIG. 3 shows an embodiment wherein a further computer, e.g. in the form of a laptop computer, a tablet computer or a smartphone, is arranged at a construction site in addition to the wearable computer.

FIG. 3 shows an embodiment wherein a further computer 162, e.g., a laptop computer, a tablet computer or a smartphone, is arranged at the construction site 104 in addition to the wearable computer in the form of the smartwatch 122. The computer 162 includes a processor 164 and a wireless communication module, or a wireless interface 166, communicating with the smartwatch 122, on the one hand, as is indicated by the arrow 132, and enabling a radio link to the road finishing machine 114, on the other hand, as is depicted by arrow 168. The wearable computer 162 is provided for detecting parameters in the context of the road finishing process, for example via the wireless communication module 166, and to present same to a site manager 118 at the construction site 104, for example in a manner as is basically known in conventional technology. In addition, the computer 162 is programmed to enable the site manager 118 to select at least one parameter from the parameters displayed there and to transmit the process data of said parameter to the smartwatch 122 for being displayed thereon. Thus, the embodiment depicted by means of FIG. 3 enables the site manager 118 who is at the construction site 104 to manually select which data from which machine is to be displayed on the display 128 of the smartwatch 122 (or on the data eyeglasses 124). This approach is advantageous since the display area 128 on the smartwatch 122 (or on the data eyeglasses 124) is limited, so that only some of the total process data can be presented. To enable this communication, the smartwatch 122 has the wireless communication module 130 so as to establish a radio link, e.g., a Bluetooth link, for example, so as to create a communication with the smartphone, tablet computer and/or laptop computer 162. The computer 162 is programmed such that the site manager, or project manager, is given the possibility of triggering functions on the data eyeglasses and/or on the smartwatch so as to determine which machine and process data is to be displayed.

Figure 4:
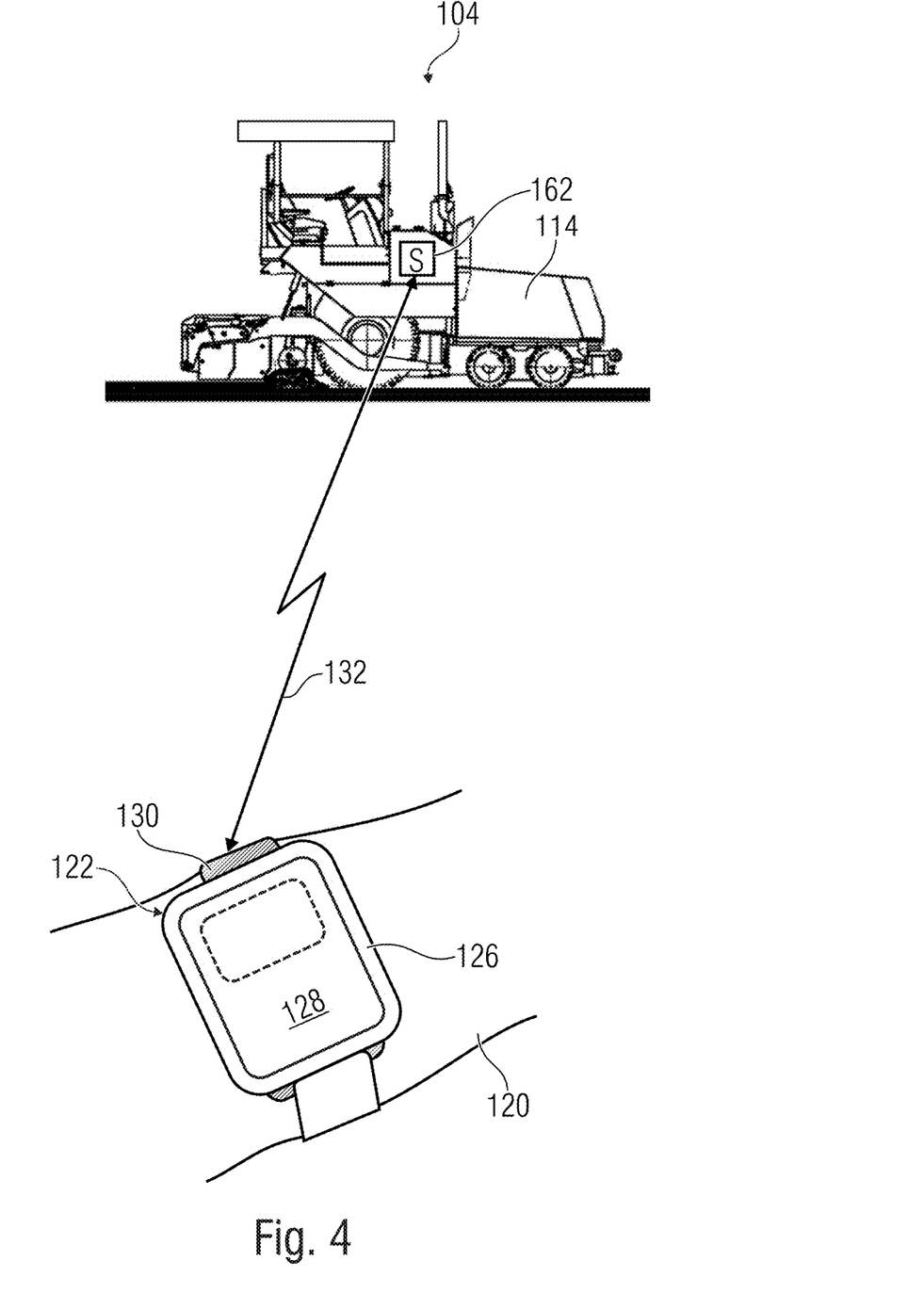
FIG. 4 shows a further embodiment of the present invention wherein a data watch and/or a wearable computer directly communicates with a road finishing machine on a construction site.

FIG. 4 shows a further embodiment of the present invention, wherein the smartwatch 122 and/or the wearable computer directly communicate(s) with the road finishing machine 114 at a construction site 104, as is indicated by means of arrow 132. The embodiment shown by means of FIG. 4 enables a communication of the smartwatch 122 (the data eyeglasses 124) with the road finishing machine 114. The road finishing machine 114, and/or the other machines/vehicles/sensors with which a corresponding communication is to occur include a suitable communication device, such as a WLAN module, which communicates with the wireless communication module, configured as a WLAN module, of the wearable computer. In accordance with embodiments, the sensors and measuring means of the finishing machines as well as the control and evaluation units thereof communicate via the CAN (controller area network) bus. To implement the inventive procedure, provision is made, in accordance with embodiments, for providing a further bus node along the CAN bus, specifically in the form of a CAN/WLAN gateway, so that the corresponding data on the CAN bus may be provided to the WLAN module for transmission to the wearable computer.

Figure 5:
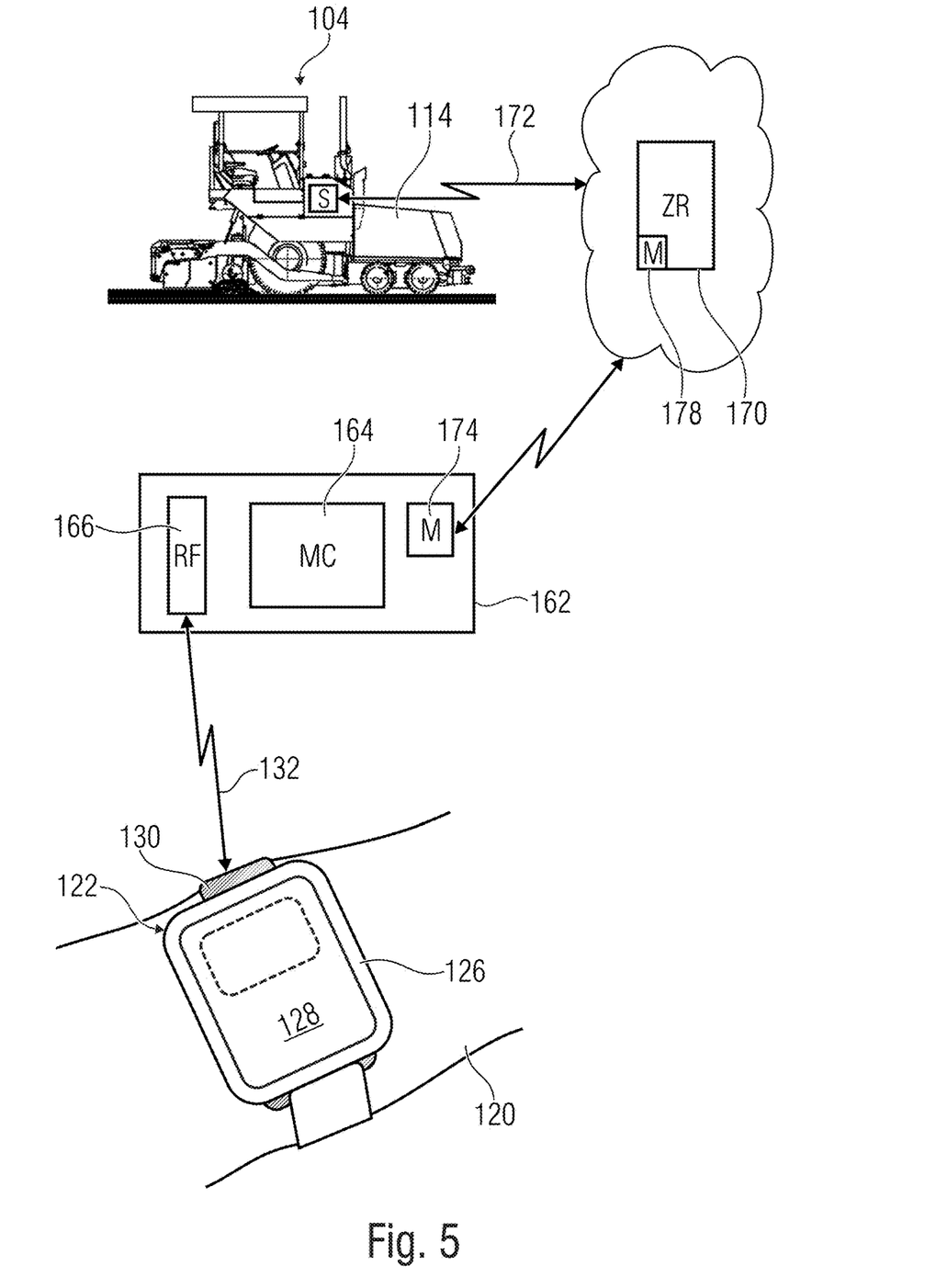
FIG. 5 shows yet another embodiment of the present application, in accordance with which a data watch and/or a wearable computer communicates with a server or central computer located at a distance from a construction site.

FIG. 5 shows a further embodiment of the present application in accordance with which the smartwatch 122 (data eyeglasses) communicates with a server or central computer 170 positioned at a distance from the construction site 104. In accordance with this embodiment, the road finishing machine 114 also communicates with the central computer 170, as is indicated by the arrow 172. In addition, the computer 162 explained by means of FIG. 3 is provided, which additionally is provided with a mobile radio module 174 so as to enable, via a mobile radio link 176, a communication with the central computer 170, which also comprises a mobile radio module 178. The embodiment shown by means of FIG. 5 thus enables a communication of the smartwatch 122 with the central computer unit 170 arranged at a distance from the construction site 104, and for this purpose additionally uses a smartphone or a tablet PC 162 communicating with the smartwatch 122 via the communication unit 166, for example via a Bluetooth connection, in the above described manner. Communication with the central computer 170 and/or the server is effected, as was mentioned above, via a super-local area network, e.g., GSM, it being possible for the mobile radio network to be a terrestrial or a satellite-based network. In the embodiment shown by means of FIG. 5, a communication of the smartwatch with all of the relevant positions is enabled, for example with the asphalt mixing plant, along the transport and at the construction site, so that data display of the relevant process data is enabled along any position of the process chain. If data lies outside an admissible range along the process chain, for example at the asphalt mixing plant or during transport, e.g., if a mixing and/or fill-in temperature at the asphalt mixing plant is too low, a corresponding reaction may be generated via the smartwatch, such as a vibration, for example, so that the site manager will be immediately made aware of this deficiency and may possibly immediately initiate steps to remedy said deficiency.

In accordance with further embodiments of the present application, the wearable computer is configured in the form of data eyeglasses (see FIG. 1) which comprise the camera module 148 in addition to the communication module 144, to the display module 140 and to the input/output module 142. In accordance with embodiments, provision is made for an automatic selection of the machine, for example of the road finishing machine 114 at the construction site 104, from which the process data is to be provided for being displayed on the display area 140, to be effected while using the camera. The data eyeglasses 124 detect a machine, e.g., the road finishing machine 114, via the camera module 148 and/or via the camera installed therein, and the detected image is sent to a smartphone, a tablet PC or a laptop 162 (see FIGS. 3 and 5) via the radio interface 132. By means of image processing, the computer 162 recognizes the machine 114 and automatically selects same, so that machine or process data of the machine that is aimed at and selected, for example, in the case of a road finishing machine, the current p placement parameters such as the temperature and the material consumption, is displayed to the site manager or project manager who is at the construction site, whereby the site manager immediately obtains an overview of the current placement process and is immediately informed about any excessive deviations.

Figure 6:
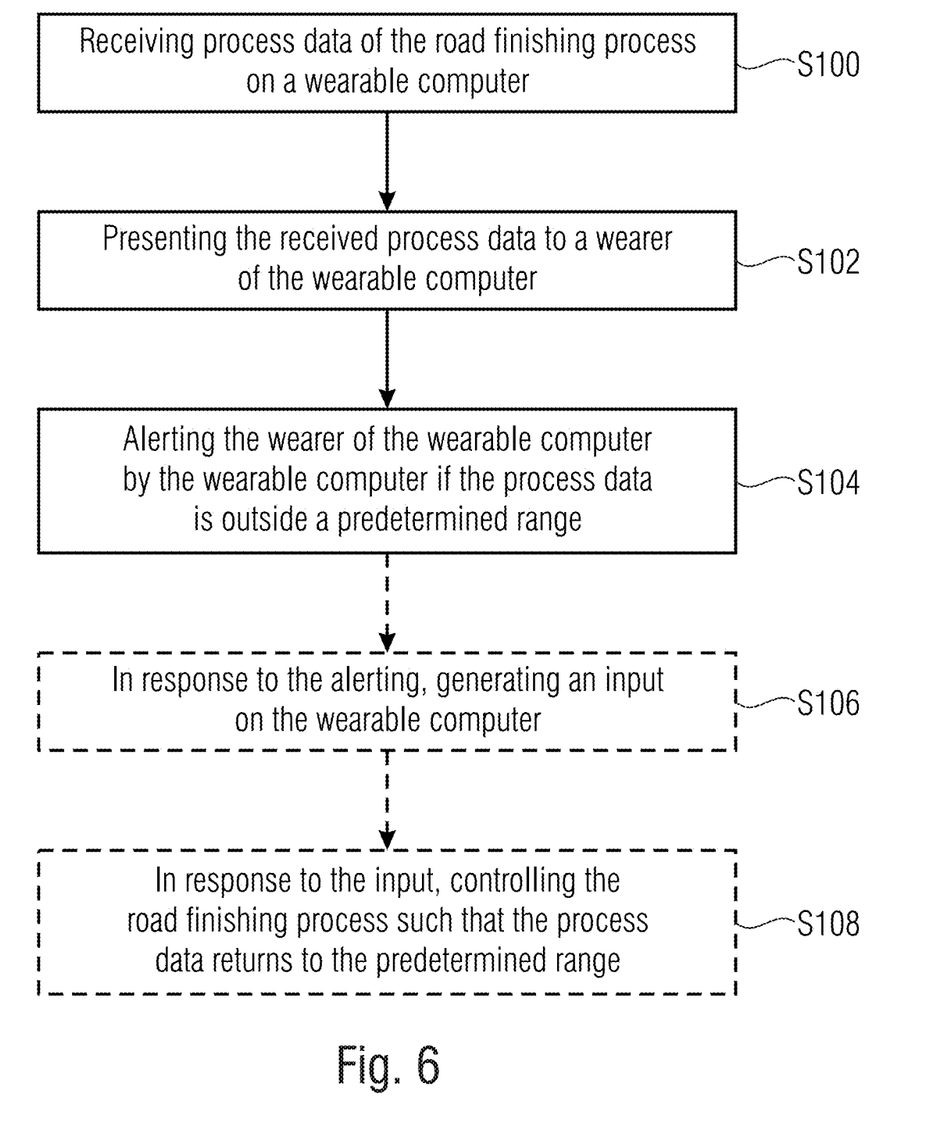
FIG. 6 shows an embodiment of the inventive method of monitoring process data in road finishing.

FIG. 6 shows an embodiment of the inventive method of monitoring process data in road finishing. According to the invention, the process data of the road finishing process is received on a wearable computer in step S100 and is presented to a wearer of the wearable computer in step S102. If it is found that the process data lies outside a predetermined range, the wearer will be alerted by the wearable computer in step S104, for example by means of a vibrating alert and/or by a visual/acoustic signal. In accordance with embodiments, provision may be made for an input into the wearable computer to be generated in response to the alerting, as is depicted in the optional step S106. In response to input, the road finishing process may be controlled such that the process data returns to the predetermined range, as is depicted in the optional step S108.

Embodiments of the present invention were described above with reference to a data watch or to data eyeglasses as possible implementations of the wearable computer. The present invention is not limited to said forms of a wearable computer. Embodiments include other forms of a wearable computer, e.g., an electronic contact lens, a head-up display displayed, e.g., on the visor of a building-site helmet, or an augmented-reality display device.

In other embodiments, the wearable computer includes an adaptive device, e.g., a bracelet, which may vibrate so as to alert the wearer, or other devices comprising no display but enabling the wearer to be alerted. In such embodiments, the wearable computer is configured to receive the process data of the road finishing process, e.g., along with information indicating an admissible range for the process data, such as an upper and/or lower limit for the data. If the wearable computer finds that process data lies outside the range indicated by the limits, alerting of the wearer of the wearable computer will be effected, e.g., by means of a vibration of the bracelet and/or by means of an acoustic/visual signal, e.g., a warning tone or a change in color of the wearable computer. Said alerting enables the wearer to check the data, e.g., on a laptop computer, which receives and presents the process data. Via the laptop computer, inputs may then be made so as to control the process, so that the process data will return to the admissible range. Optionally, the bracelet may include a display for presenting the data and/or an input device for inputting information for controlling the road finishing process.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable. Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer. The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A system, comprising
a road finisher located at a construction site where a road finishing is performed,
a mixing plant where a material for the road finishing is produced,
a transporter located at the construction site, at the mixing plant or therebetween; and
a device for monitoring process data in road finishing, wherein
the device includes a wearable computer, the wearable computer connected to the road finisher, to the mixing plant, and to the transporter so as to receive the process data from the construction site where the road finishing is performed, from the place of manufacture where the material for road finishing is produced, and from one or more positions located between the place of manufacture and the construction site, and
the wearable computer configured to effect alerting of the wearer of the wearable computer in the event that process data lie outside a predetermined range.

2. The system as claimed in claim 1, wherein the wearable computer is configured to present the process data to a wearer of the wearable computer.

3. The system as claimed in claim 1, comprising:
a computer located at the construction site and configured to receive process data for a plurality of parameters of the road finishing,
the computer and the wearable computer each comprising a wireless communication module, and
the computer being configured to enable the wearer of the wearable computer to select at least one parameter from the plurality of parameters of road finishing and to effect transmission of the process data of the selected parameter to the wearable computer.

4. The system as claimed in claim 3, wherein the computer is configured to communicate, via the wireless communication module, with one or more construction machines and/or with one or more construction vehicles and/or with one or more sensors so as to receive the process data.

5. The system as claimed in claim 3, wherein the computer comprises a control computer of a construction machine, of a construction vehicle or of a sensor.

6. The system as claimed in claim 3, comprising:
a central computer arranged at a distance from the construction site and the place of manufacture and comprising a mobile radio module so as to establish a terrestrial or satellite-based mobile radio link between one or more construction machines and/or one or more construction vehicles and/or one or more sensors and the central computer,
the computer comprising a mobile radio module so as to effect a terrestrial or satellite-based mobile radio link with the central computer so as to acquire the process data via the central computer.

7. The system as claimed in claim 1, wherein the wearable computer is configured to effect visual alerting and/or acoustic alerting and/or tactile alerting.

8. The system as claimed in claim 1, wherein the wearable computer is configured to effect a vibrating alert.

9. The system as claimed in claim 1, wherein the wearable computer comprises a data watch, or an augmented-reality display device, or eyeglasses, or a head-up display.

10. The system as claimed in claim 1, wherein
the wearable computer comprises a camera,
the wearable computer being configured to send an image, taken by the camera, of a construction machine, of a construction vehicle or of a sensor from which the process data is to be received, to a computer via the wireless communication module,
the computer being configured to identify the unit depicted in the received image, to request process data for at least one selected parameter from the identified unit, and to send the process data for the selected parameter to the wearable computer, via the wireless communication module, for presentation to the wearer of the wearable computer.

11. The system as claimed in claim 1, wherein the wearable computer is configured to enable the wearer to perform an input, in response to the alert, so as to control the road finishing process such that the process data returns to the predetermined range.

12. A method, comprising
connecting a wearable computer to a road finisher located at a construction site where a road finishing is performed, a mixing plant where a material for the road finishing is produced, and to a transporter located at the construction site, at the mixing plant or therebetween;
receiving, by the wearable computer, the process data from the construction site where the road finishing is performed, from the place of manufacture where the material for road finishing is produced, and from one or more positions located between the place of manufacture and the construction site;
monitoring the process data; and
alerting the wearer of the wearable computer in the event that process data lie outside a predetermined range.

13. A non-transitory digital storage medium having a computer program stored thereon to perform, when said computer program is run by a computer, a method comprising:
receiving, by a wearable computer, process data from a construction site where a road finishing is performed, from a place of manufacture where a material for the road finishing is produced, and from one or more positions located between the place of manufacture and the construction site, the wearable computer connected to a road finisher located at the construction site where the road finishing is performed, to a mixing plant where the material for the road finishing is produced, and to a transporter located at the construction site, at the mixing plant or therebetween;
monitoring the process data; and
alerting the wearer of the wearable computer in the event that process data lie outside a predetermined range.

* * * * *